United States Patent [19]

Sasaki et al.

[11] 4,434,209

[45] Feb. 28, 1984

[54] CAPACITOR

[75] Inventors: Tohru Sasaki; Mitsuru Ohta; Syuuzi Terasaki; Syozo Kakizaki, all of Iwaki, Japan

[73] Assignee: Kureha Kagaku Kogyo Kabushiki Kaisha, Tokyo, Japan

[21] Appl. No.: 249,958

[22] Filed: Apr. 1, 1981

[30] Foreign Application Priority Data

May 19, 1980 [JP] Japan ................................. 55-66312

[51] Int. Cl.$^3$ ...................... B32B 15/08; B32B 27/06; N01G 4/08
[52] U.S. Cl. .................................. 428/416; 361/323; 428/421; 428/422; 428/458; 428/463; 428/522; 524/311
[58] Field of Search ............... 428/412, 421, 422, 480, 428/483, 500, 416, 458, 463; 29/25, 42; 260/31.6; 361/323; 524/311

[56] References Cited

U.S. PATENT DOCUMENTS

| | | | |
|---|---|---|---|
| 3,541,039 | 11/1970 | Whiton | 524/311 |
| 3,991,451 | 11/1976 | Maruyama et al. | 29/25.42 |
| 4,166,876 | 9/1979 | Chiba et al. | 428/421 X |
| 4,173,033 | 10/1979 | Sako et al. | 361/323 |
| 4,241,128 | 12/1980 | Wang | 428/421 X |
| 4,297,427 | 10/1981 | Williams et al. | 428/421 |
| 4,298,719 | 11/1981 | Mizuno et al. | 428/422 X |

*Primary Examiner*—Thomas J. Herbert, Jr.
*Attorney, Agent, or Firm*—Wegner & Bretschneider

[57] ABSTRACT

Capacitor having layers of dielectric material containing at least one oriented film prepared by molding a resin composition comprising polyvinylidene fluoride, polycarbonate and/or thermoplastic polyester into unstretched film and stretching the thus molded unstretched film as at least a part of the constituents of the layer of dielectric material is disclosed.

5 Claims, No Drawings

CAPACITOR

SUMMARY OF THE INVENTION

The present invention relates to a capacitor, and more in detail, relates to a capacitor having at least a layer of dielectric material, which contains, as at least a part of the constituents thereof, an oriented plastic film having dielectric specificities. The characteristic feature of the capacitor according to the present invention is that the capacitor has a layer of dielectric material, which contains at least an oriented film prepared by stretching an un-oriented film molded from a resin composition into at least one direction as a part of the layer of dielectric material, the resin composition comprising polyvinylidene fluoride, polycarbonate and/or thermoplastic polyester in a weight ratio of 100:0.1 to 30.

The term "polyvinylidene fluoride" herein used means not only the homopolymers of vinylidene fluoride but also copolymers of more than 50 mole % of vinylidene fluoride and a comonomer copolymerizable with vinylidene fluoride.

DETAILED DESCRIPTION OF THE INVENTION

The major object of the present invention is to provide capacitors having at least one layer of dielectric material, which contains a specified plastic film of dielectric specificities as at least a part of the constituents thereof, the capacitor being excellent in resisting high voltages and having a high insulation resistance and being highly impregnable with insulating oil. Other objects of the present invention will become apparent from the following description:

In consideration of the recent requirement for miniaturization of capacitors of high performances, the capacitors in which plastic film is partially or wholly used as its layer of dielectric material have been used in place of the broadly used so-called paper capacitors in which sheets of insulating paper are used as the layer of dielectric material.

Namely, although the capacitor in which a plastic film is used as the layer of dielectric material has a lower dielectric constant than those in which insulating paper is used for the purpose, the former has an extremely high dielectric breakdown voltage and a high insulation resistance, and besides the plastic film can be made thinner.

Accordingly, adoption of such a plastic film greatly contributes to the miniaturization of capacitors of high performances.

Of these plastic films, films of polyvinylidene fluoride, because of its high dielectric constant, have been utilized hitherto as the dielectric material for oil-impregnated DC capacitors small in size and high in capacitance usable at a high voltage.

However, on the other hand, since in the capacitor in which plastic film is used, impregnation of an impregnating agent, for example, an insulating oil to the plastic film is inferior to the impregnation to the insulating paper, there are demerits of fears of deterioration of the specific performances and of breakdown accidents on such a capacitor. Such demerits are inevitable also in the conventional film of polyvinylidene fluoride.

Namely, according to the same poor impregnation of the impregnating agent to such a film as has been seen in other plastic films, many parts of the capacitor element remain not yet impregnated after the step of impregnation with the impregnating agent, and such parts cause the deterioration of the film by corona discharge under a high voltage, thus resulting in the insulation breakdown of the capacitor itself, which is a demerit of such capacitors.

Such a demerit seen in the conventional film of polyvinylidene fluoride is caused by the physical and chemical properties of the surface of the film, especially the flatness and smoothness of the film, which extremely reduce the wettability of the film by the impregnating agent.

The prevent inventors, in consideration of the excellent electrical properties of films of polyvinylidene fluoride, have studied the way of improving the performance of films of polyvinylidene fluoride as a dielectric material by overcoming the above-mentioned demerit, and as a result, have attained the present invention.

The present invention is explained in detail as follows:

At least one of the plastic films for use in the layer of dielectric material of the capacitor according to the present invention is, as has been stated, an oriented film prepared by stretching an un-oriented film into at least one direction, the un-oriented film being molded from a resin composition comprising polyvinylidene fluoride, polycarbonate and/or thermoplastic polyester in a weight ratio of 100:0.1 to 30. In the case where polyvinylidene fluoride is a copolymer of more than 50 mole % of vinylidene fluoride and a comonomer copolymerizable with vinylidene fluoride, the copolymer is a copolymer of more than 50 mole % of vinylidene fluoride and tetrafluoroethylene, hexafluoropropylene, chlorotriluoroethylene, trifluoroethylene or vinyl fluoride.

The thermoplastic polyester, the other constituting component of the film of the present invention, includes, for example, polyethylene terephthalate, polyethylene isophthalate, polymethylene terephthalate and polyethylene naphthalate as well as copolymers thereof and mixtures of two or more of the just-mentioned polymers.

The film according to the present invention is obtained by a two-step process, namely, the first step of melt-extruding and molding a resin composition of polyvinylidene fluoride containing 0.1 to 30 parts by weight of a polycarbonate and/or the thermoplastic polyester per 100 parts by weight of polyvinylidene fluoride to prepare an un-oriented film and the second step of stretching the thus prepared un-stretched film into at least one direction.

Although neither polycarbonate nor thermoplastic polyester is compatible with polyvinylidene fluoride, owing to the presence of ester-linkages in the molecule of polycarbonate and polyester, both the polymers are considered to have some affinity to polyvinylidene fluoride. In the case where a substance having no affinity to polyvinylidene fluoride such as inorganic powdery materials and polyethylene is mixed with polyvinylidene fluoride, voids are formed in the interface of polyvinylidene fluoride and the thus-added material; however, no such voids are formed in the case where polycarbonate and/or thermoplastic polyester is admixed with polyvinylidene fluoride.

However, in cases where the amount of polycarbonate and/or thermoplastic polyester is under 0.1 part by weight to 100 parts by weight of polyvinylidene fluoride, the impregnation of the impregnating agent to the film is not improved, and on the other hand, in cases where the amount is over 30 parts by weight to 100 parts by weight of polyvinylidene fluoride, the film becomes breakable during the step of stretching. In addition, the amount of polycarbonate and/or thermoplastic polyester of 0.5 to 20 parts by weight to 100 parts by weight of polyvinylidene fluoride is preferable in view of the improvement of other properties of the obtained film. By the way, polycarbonate or thermoplastic polyester may be singly admixed with polyvinylidene fluoride, or the two may be admixed together with polyvinylidene fluoride simultaneously.

The un-oriented film obtained by melt-extruding the resin composition may be stretched usually at a temperature of 120° to 180° C. longitudinally to be a monoaxially oriented film, or the thus-monoaxially oriented film may be further stretched in a transverse direction to form a biaxially oriented film. Moreover, the un-oriented film may be stretched simultaneously both longitudinally and transversally. The ratio of stretching is suitably 4 to 30 times in area ratio.

Although the thus-obtained stretched and oriented film has surfaces of minutely rough texture and is suitably used as a layer of dielectric material of capacitors or a part of the constituents of the layer as it is, one or both sides thereof may be treated by superficial activation such as corona discharge.

In order to apply the thus-obtained stretched film into a layer of dielectric material of a capacitor, the film is preferably wound into a coil-form together with electrode foils, for example, aluminum foils, to be an element of the capacitor. In this case, it is preferable to use two or more of the stretched films laminated; however, it is not always necessary to use only the stretched films as the dielectric material, for example, in a capacitor which necessitates three layers of dielectric material, the two layers directly contacting the electrode foil are the above-mentioned stretched film and the intermediate layer is the stretched film of homopolymer of vinylidene fluoride or a conventional insulating paper.

In addition, in the capacitor according to the present invention, a film having a deposited metal layer on the film's surface may be applied instead of the above-mentioned metal foil used in lamination with the film of the present invention.

A capacitor is possibly prepared by impregnating an impregnating agent such as an insulating oil under vacuum into the thus-obtained capacitor element. In this case, since the surface of the stretched film used according to the present invention is minutely rough in texture, the impregnation is favorably carried out. The impregnating agent for use in this case includes not only mineral insulating oil obtained from fractions of petroleum, synthetic insulating oil consisting of aromatic hydrocarbons such as alkylbenzenes, alkylnaphthalenes, diarylalkanes, diarylethanes, etc., substances of low dielectric constant such as silicone oil and waxes but also substances of a high dielectric constant such as linseed oil, phthalic esters, phosphoric esters, fluorosilicone oils and aromatic fluoro-carbon oils. These substances may be applied singly or as a mixture of more than two components thereof and further, those added with a small amount of a stabilizing agent may be applied.

The method of preparing the capacitor according to the present invention and the effects of the performance of the capacitor are exemplified while referring to examples. The evaluation of their performance was carried out according to the following methods:

(1) Composite dielectric constant ($\bar{\epsilon}$)

Capacitance of a specimen of capacitor (after impregnation) at 20° C. and 1 KHz, the electrode area of the capacitor and the thickness of the layer of dielectric material between electrodes were measured, and the composite dielectric constant of the specimen was obtained by the conventional method of calculation.

(2) Insulation resistance ($\Omega \cdot F$)

From the value of capacitance C ($\mu F$) of the specimen of capacitor at 20° C. and 1 KHz, and the value of resistance of the specimen R (M$\Omega$) measured at 20° C. for 2 min at 1 KV, DC, the insulation resistance was obtained by the following formula:

Insulation resistance ($\Omega F$) = C × R (3) Breakdown voltage for a short period (V,DC)

An increasing voltage of direct current was loaded between the two terminals of the specimen at a rate of voltage increase of about 100 V/sec, and the voltage at which the breakdown occurred was determined as the breakdown voltage for a short period.

(4) Voltage at the inception of corona discharge

The voltage at which the partial discharge was incepted was determined on the specimen set in the partial discharge determinating apparatus of 150 pc of sensitivity.

The tabulated values under the above-mentioned properties of (1) to (4) are the mean values of 5 specimens unless specified.

EXAMPLE 1

Into a homopolymer of polyvinylidene fluoride having 1.10 of inherent viscosity, a polycarbonate(Panlite, grade 1300W, manufactured by Teijin Kasei Co. Ltd., Japan) was admixed at a ratio shown in Table 1 to prepare a resin mixture, and the mixture was extruded at 260° C. to be pellets of the resin composition. The pellet-form composition was subjected to an extruder provided with a T-die to be an un-oriented sheet at 260° C. The sheet was successively stretched both longitudinally (2.7 times in length) and transversally (4.5 times in length) at a area ratio of 12 times to give a bi-axially oriented film of 9$\mu$ in thickness.

Then, a set of laminate was prepared by combining two of the thus-formed oriented film and one aluminum foil in an order of foil/film/film, and two sets of such a laminate were further laminated in the order of (foil/film/film)$_1$/(foil/film/film)$_2$, and the thus doubly laminated material was wound up to be a capacitor element. Alkylnaphthalene was impregnated to the thus prepared capacitor element at 80° C. and under a reduced pressure of 10$^{-2}$ Torr to prepare a capacitor of about 0.5 $\mu F$ in capacitance.

The composite dielectric constant, the insulation resistance, the breakdown voltage for a short period and the corona-inception voltage of the thus prepared capacitor were measured as mentioned above and shown in Table 1.

In addition, as comparative examples, capacitors were prepared by the same manner as in Example 1, respectively using the same polyvinylidene fluoride not containing any other substance (Comparative Example 1) and using a resin compound of 100 parts by weight of the same polyvinylidene fluoride as in Example 1 and 40 parts by weight of the same polycarbonate as in Example 1 (Comparative Example 2). The performances of these two kinds of capacitors were also shown in Table 1.

TABLE 1

Performance of capacitors in Example 1.

| Number | Amount of polycarbonate[1] | Composite dielectric constant ($\epsilon$) | Insulation resistance ($\Omega \cdot F$) | Breakdown voltage (V, DC) | Inception voltage of corona discharge (V) |
|---|---|---|---|---|---|
| Example 1 | | | | | |
| No. 1 | 0.5 | 8.8 | 1800 | 6800 | 2250 |
| No. 2 | 2 | 8.5 | 2250 | 8200 | 2500 |
| No. 3 | 5 | 8.2 | 2800 | 8500 | 2800 |
| No. 4 | 15 | 6.3 | 4500 | 8400 | 2750 |
| No. 5 | 20 | 5.0 | 7000 | 7500 | 2200 |
| Comparative Example 1 | 0 | 8.9 | 1400 | 6100 | 1800 |
| Comparative Example 2 | 40 | 3.6 | 9800 | 5800 | 1750 |

Note:
[1] parts by weight of polycarbonate to 100 parts by weight of polyvinylidene fluoride.

As is seen in Table 1, in the capacitor in which a oriented film formed by molding and stretching from a resin composition containing polyvinylidene fluoride and polycarbonate in a weight ratio of 100:0.5 to 20 is used as the element, the breakdown voltage for a short period and the corona discharge-inception voltage were improved as compared to those in the capacitor in which an oriented film formed from a resin composition of polyvinylidene fluoride not containing the polycarbonate. As for the insulation resistance, also an improvement was observed. These facts are based on the improvement of the impregnation of the capacitor element with the impregnating agent.

However, in cases where the amount of polycarbonate was higher than 30 parts by weight per 100 parts by weight of polyvinylidene fluoride as in the capacitor of Comparative Example 2, the composite dielectric constant and the breakdown voltage for a short period of the capacitor showed the reduced values as compared to those in the capacitor prepared by the resin compound not containing polycarbonate as in Comparative Example 2.

For reference, the capacitance of capacitors prepared in Example 1 and Comparative Examples 1 and 2 are compared as follows:

The volume efficiency factor [D. A. McLEAN; IEEE Trans. Vol. PMP-3 No. 4 (DEC, 1967) "Dielectric Materials and Capacitor Miniaturization"] of a series of capacitors different in its material of dielectric layer, however, having the same and fixed values of its volume, of the thickness of dielectric layers, and of the length of wound layer and the same impregnating agent is proportional to the composite dielectric constant ($\epsilon$) and also proportional to the square of the nominal highest voltage. Since the nominal highest voltage of a DC-capacitor is determined in proportion to the breakdown voltage for a short period, for example, to be about 70% of the value of breakdown voltage for a short period (V, DC), when the values of the product of $\bar{\epsilon}$ and $V^2$, DC of the capacitors are compared, their volume efficiency factors are possibly compared.

Accordingly, in the case where the capacitors of Nos. 1 to 5 of Example 1 and those of Comparative Examples 1 and 2 are made to have the same volume, the relative amounts of volume efficiency factor of the capacitors are respectively obtained from the values of $\epsilon$ and $V^2$, DC in Table 1 as follows, wherein the volume efficiency factor of the capacitor of Compative Example 1 is taken as 100:

122.9, 172.6, 178.9, 134.2, 84.9 and 36.5.

As is seen in the figures, the capacitors having respective constitutions in Example 1 have been greatly improved in their volume efficiency factor as compared to the conventional one having the constitution of Comparative Example 1.

EXAMPLE 2

From the two kinds of resin composition one of which was prepared by admixing 9 parts by weight of a thermoplastic polyester (Koder Copolyester PET G 6763, manufactured by Eastman Kodak Co., USA) with 100 parts by weight of polyvinylidene fluoride as in Example 1, and other of which was prepared by admixing 9 parts by weight of a polycarbonate (Idemitsu Polycarbonate I-3000, manufactured by Idemitsu Petrochemical Co., Japan) with 100 parts by weight of the same polyvinylidene fluoride as above, respective two kinds of biaxially oriented film of thickness of 9μ were prepared by the same manner as in Example 1. After making respective capacitor elements using the two kinds of the thus prepared film, purified tricresyl phosphate was impregnated into the respective capacitor elements at 80° C. under a reduced pressure of $10^{-2}$ Torr to prepare two kinds of capacitors of about 1 μF of capacitance.

The specific properties of the capacitors are shown in Table 2.

TABLE 2

| Number | Admixed polymer | Composite dielectric constant ($\epsilon$) | Insulation resistance ($\Omega \cdot F$) | Breakdown voltage (V, DC) |
|---|---|---|---|---|
| Example 2 | | | | |
| No. 1 | PET G 6763 | 8.5 | 2900 | 7250 |
| No. 2 | Polycarbonate I-3000 | 8.4 | 3150 | 7550 |

As is seen in Table 2, also in the case of using a thermoplastic polyester, a capacitor of excellent specific properties is obtained as in the case of using a polycarbonate admixed with polyvinylidene fluoride.

EXAMPLE 3

Three kinds of capacitor element were prepared by combining the three layers of dielectric material with aluminum foils as electrodes in combination shown in Table 3 and winding up, the first layer being the two-axially oriented film prepared in Example 2, No. 2 (referred to as PC-9, hereinafter), the second layer being a bi-axially oriented film of polyvinylidene fluoride of 9μ in thickness (referred to as PVDF-BO) and the third layer being a conventional insulating paper for capacitors of 9μ in thickness (referred to as CP hereinafter). By impregnating tricresyl phosphate into the thus prepared capacitor elements at 80° C. under a reduced pressure of $10^{-2}$ Torr, capacitors were prepared and their specific properties were measured. The combination and the properties are shown in Table 3, the combination of PVDF-BO/CP/PVDF-BO being Comparative Example 3.

TABLE 3

| No. | Combination of three layers | Composite dielectric constant ($\epsilon$) | Insulation resistance ($\Omega \cdot F$) | Breakdown voltage for short period (V, DC) |
| --- | --- | --- | --- | --- |
| Example 3 | | | | |
| No. 1 | PC-9/PVDF-BO/PC-9 | 9.8 | 3500 | 9800 |
| No. 2 | PC-9/CP/PC-9 | 8.6 | 4000 | 11000 |
| Comparative Example 3 | PVDF-BO/CP/PVDF-BO | 9.2 | 2600 | 7600 |

As is seen in Table 3, the capacitors prepared from the three-layered dielectric material made by bringing the stretched films formed from a resin composition containing polycarbonate admixed with polyvinylidene fluoride into contact with an electrode, i.e., No. 1 and No. 2 showed their electric properties remarkably improved as compared to the conventional capacitor prepared from the three-layered dielectric material in Comparative Example 3.

What is claimed is:

1. A capacitor having layers of dielectric material, at least one of said layers being an oriented plastic film obtained by stretching in at least one direction an unstretched film of a resin composition comprising a mixture of (a) a polyvinylidene fluoride and (b) at least one resin selected from the group consisting of a polycarbonate, a thermoplastic polyester, and a mixture thereof, the weight ratio of (a) to (b) being from 100:0.1 to 100:30 adjacent a metallic electrode layer.

2. The capacitor of claim 1 wherein (a) is a homopolymer of vinylidene fluoride.

3. The capacitor of claim 1 wherein (a) is a copolymer of greater than 50 mole % vinylidene fluoride and a comonomer copolymerizable with vinylidene fluoride.

4. The capacitor of claim 3 wherein said comonomer polymerizable with vinylidene fluoride is selected from the group consisting of tetrafluoroethylene, hexafluoroethylene, chlorotrifluoroethylene, trifluoroethylene, and vinyl fluoride.

5. The capacitor of claim 1, 2, or 3, wherein said resin composition comprises 100 parts by weight of (a) and 0.5 to 20 parts by weight of (b).

* * * * *